United States Patent
Iwamura

(10) Patent No.: US 7,461,788 B2
(45) Date of Patent: Dec. 9, 2008

(54) INFORMATION READING APPARATUS AND INFORMATION READING SYSTEM

(75) Inventor: Takahiro Iwamura, Kawanishi (JP)

(73) Assignee: Panasonic Corporation, Osaka (JP)

( * ) Notice: Subject to any disclaimer, the term of this patent is extended or adjusted under 35 U.S.C. 154(b) by 624 days.

(21) Appl. No.: 11/190,073

(22) Filed: Jul. 27, 2005

(65) Prior Publication Data
US 2006/0022046 A1 Feb. 2, 2006

(30) Foreign Application Priority Data
Jul. 29, 2004 (JP) .......................... P2004-221347

(51) Int. Cl.
G06K 7/08 (2006.01)
(52) U.S. Cl. ...................... 235/451; 235/439; 235/440; 235/449; 340/572.4; 340/10.2; 340/10.32; 340/10.33
(58) Field of Classification Search ................. 235/439, 235/440, 449, 451; 340/572.4, 10.2, 10.32, 340/10.33
See application file for complete search history.

(56) References Cited

U.S. PATENT DOCUMENTS

| | | | | |
|---|---|---|---|---|
| 5,550,548 A | * | 8/1996 | Schuermann | 342/42 |
| 6,223,984 B1 | * | 5/2001 | Renner et al. | 235/380 |
| 6,557,754 B2 | * | 5/2003 | Gray et al. | 235/375 |
| 6,827,281 B2 | * | 12/2004 | Edmonson et al. | 235/492 |
| 6,899,270 B2 | * | 5/2005 | Obayashi et al. | 235/451 |
| 7,051,932 B2 | * | 5/2006 | Fernandes et al. | 235/449 |
| 7,243,855 B2 | * | 7/2007 | Matsumoto et al. | 235/451 |
| 7,255,272 B2 | * | 8/2007 | Bedell et al. | 235/440 |

FOREIGN PATENT DOCUMENTS

JP 4195380 7/1992

* cited by examiner

Primary Examiner—Michael G Lee
Assistant Examiner—Kristy A Haupt
(74) Attorney, Agent, or Firm—Dickinson Wright, PLLC

(57) ABSTRACT

A card system of a magnetic card which reduces investment costs for switching over a card infrastructure and transmits/receives a data of a contactless smart card and information representing the state of the contactless smart card only by changing software is provided. Based on the communication result with the contactless smart card 17 through a communication part 2, the information of the contactless smart card 17 or the information representing the state of the contactless smart card 17 are output with different formats or different timing charts, respectively, and are output through an I/F part 3 with a specification equal to that of an output signal of a magnetic card reader.

18 Claims, 13 Drawing Sheets

RESPONSE OF CONTACTLESS SMART CARD A

RESPONSE OF CONTACTLESS SMART CARD B

⇩ COMBINATION

AMPLIFIER OUTPUT OF CARD READER

DEMODULATOR OUTPUT

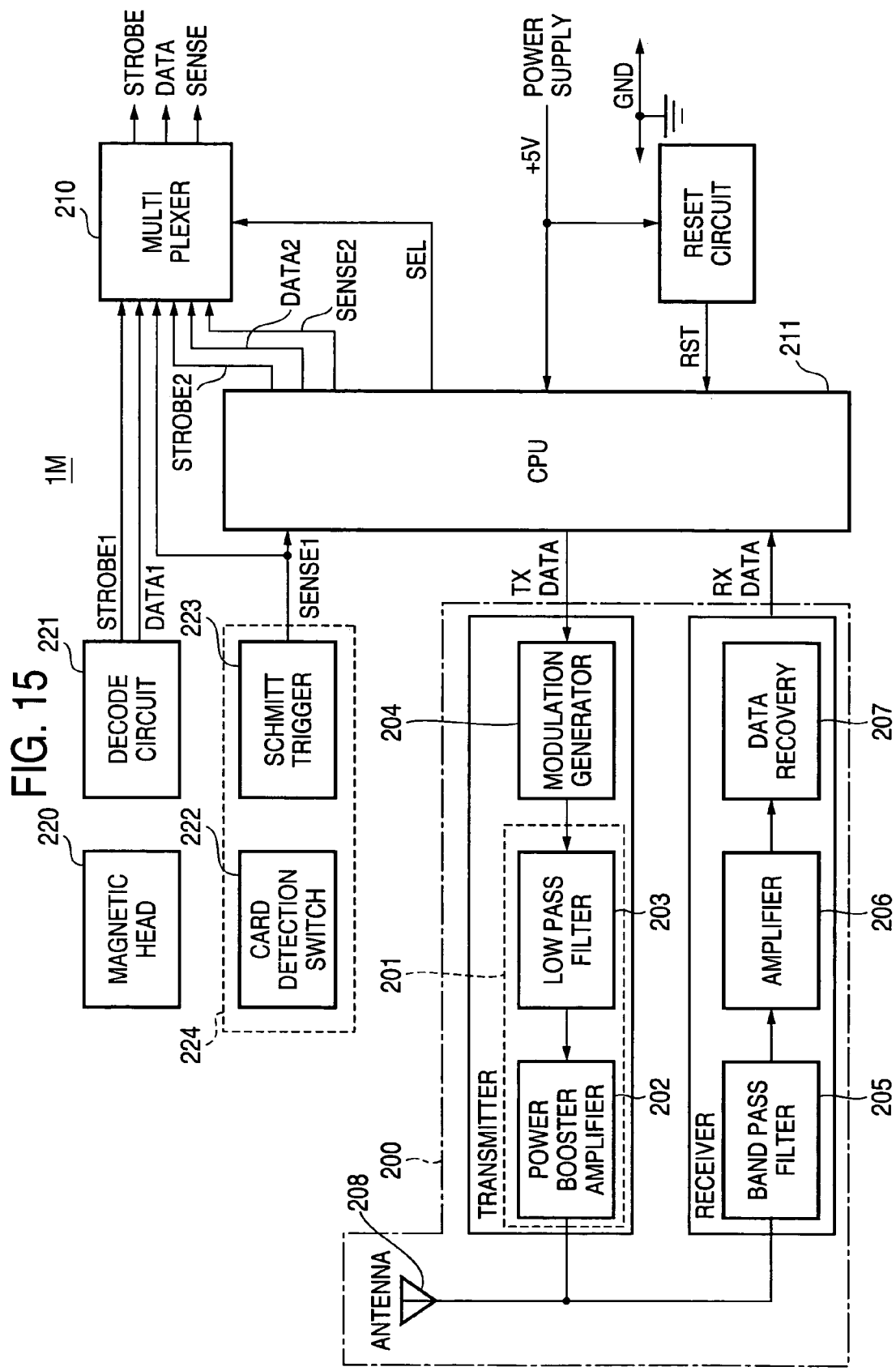

INFORMATION READING APPARATUS AND INFORMATION READING SYSTEM

This application is based on Japanese Patent Application No. 2004-221347, which is incorporated herein by reference.

BACKGROUND OF THE INVENTION

1. Field of the Invention

The present invention relates to an information reading apparatus, and more particularly, to an information reading apparatus and an information reading system which can read various information stored in a card.

2. Description of the Related Art

Recently, a system corresponding to various cards such as a cash card, a credit card or a commutation ticket is switched from a conventional magnetic card to a smart card or a new system corresponding to the smart card has been introduced. Recently, a contactless smart card is attracting much attention. This contactless smart card can send or receive information only by holding the contactless smart card to a reading apparatus and has a rapid processing speed more than that of the magnetic card. Also, since the contactless smart card includes a shock absorbing structure which simultaneously reads a plurality of objects to be read, it has good operability and convenience. Further, since the reading apparatus of the contactless smart card does not require a mechanism for carrying the card, abrasion or contact failure of a magnetic head or a contact terminal is not generated and thus costs for repairing or managing the system can be remarkably reduced. Thus, the contactless smart card is expected to be widely used in various fields.

However, the system using the contactless smart card is now used in some fields, but is not currently popularized, because large-scale initial investment is required to switch an infrastructure for the magnetic card which has been established up to now, such as existing various terminals or networks, to an infrastructure for the contactless smart card.

In consideration of the costs or the infrastructure, the infrastructure for the magnetic card must be seamlessly switched over to the infrastructure for the contactless smart card. In order to seamlessly switch over the infrastructure for the card, a technology that a communication data converting interface for converting the smart card data to have the communication specification equal to that of the magnetic card data is provided to the smart card reading and writing apparatus is known (for example, JP-A-4-195380).

FIG. 19 illustrates a card type automatic vending machine disclosed in JP-A-4-195380. The smart card reading and writing apparatus contacting with the card type automatic vending machine will be described with reference to FIG. 19.

In FIG. 19, a reference numeral 301 is the card type automatic vending machine, and a connector 307 is connected to a main control part 302 which is a master control part through a control bus line 309. The connector 307 is connected with a magnetic card reading and writing apparatus 309 for processing a magnetic card, and the main control part 302 controls the entire automatic vending machine by transmitting/receiving data or transmitting an instruction to/from a communication interface 310 connected through the connector 307 by polling.

In the card type automatic vending machine 301, a communication data converting interface 313 for a communication interface 312 is provided in a smart card reading and writing apparatus 311. The data of the smart card is read by the smart card reading and writing apparatus 311 and sent to the communication data converting interface 313 thorough the communication interface 312. The communication data converting interface 313 converts the smart card data to have the communication specification equal to that of the data transmitted from the communication interface 310 of the magnetic card reading and writing apparatus 309, and transmits the converted smart card data to the main control part 302.

By this structure, the smart card reading and writing apparatus 311 can be connected to the connector 307 for connecting the magnetic card reading and writing apparatus 309, without changing the card type automatic vending machine 301 having an interface for the magnetic card reading and writing apparatus, and thus the smart card can be easily used (See pages 2-3 and FIG. 1 of JP-A-4-195380).

JP-A-4-195380 describes an interface between equipments, which performs two-way communication through a general serial port. Most of magnetic card readers connected to existing magnetic card systems divide and outputs a signal reproduced by a magnetic head into a clock signal (data identifying timing signal) and a data signal using a demodulating circuit, and transmits these signals to an upper level apparatus, without performing a process such as frame format conversion for an electrical interface of a physical medium or data transmission. That is, the existing magnetic card system performs one-way communication for transmitting the data written on the magnetic card to the upper level apparatus.

Furthermore, when the smart card reading and writing apparatus is substituted with a contactless smart card reading and writing apparatus, the contactless smart card reading and writing apparatus reads a data of a contactless smart card located in a communication range, converts the data into the data having the same communication specification as the magnetic data image information output from a magnetic card reader, and transmits the converted data to the upper level apparatus. Also, although a plurality of contactless smart cards exist in the communication range, a specific carrier is selected by a shock absorbing mechanism and thus the process is correctly performed.

However, in order to correctly confirm payment decision of a user in application fields such as a financial card such as a cash card or a credit card or a traffic card such as a commutation ticket, when a plurality of the contactless smart cards exist in the communication range or the specification of the contactless smart card is not matched to that of a reading part, the user must be notified that the process is progressed to a next operation without processing the card.

However, in the conventional structure, since the data read from the contactless smart card is simply converted into magnetic data image information and transmitted to the upper level apparatus, a means for treating or processing the information when the plurality of the contactless smart cards exist in the communication range is not disclosed. Accordingly, the user cannot know the state that the card is not processed, and thus information on which only one card is positioned in the communication range or the card having the specification which is not matched to the specification of the reading part is removed and the card having the specification which is matched to the specification of the reading part is positioned cannot be provided to the user. Thus, the user cannot be prompted to perform the next suitable operation.

SUMMARY OF THE INVENTION

Accordingly, it is an object of the present invention to provide an information reading apparatus and an information reading system using the same, which can transmit a data read from a contactless data carrier as well as information on the state of the contactless data carrier located in a communication range and can remarkably reduce investment costs for the card infrastructure.

In order to solve the object, there is provided an information reading apparatus comprising: a first communication part which wirelessly communicates with a contactless data carrier; a second communication part which communicates with an upper level apparatus; and a control part which determines whether a plurality of contactless data carriers exist in a communication range of the first communication part based on the communication result with the contactless data carrier through the first communication part, and allows the second communication part to transmit to the upper level apparatus information that the plurality of the contactless data carriers exist using a clock signal and a data signal with a communication specification equal to that of a magnetic card reading apparatus if the control part determines the plurality of the contactless data carriers exist.

By this structure, the information that the plurality of the contactless data carriers exist in the communication range can be transmitted to the outside using the clock signal and the data signal with the communication specification of the magnetic card reading apparatus.

Furthermore, there is provided an information reading apparatus comprising: a first communication part which wirelessly communicates with a contactless data carrier; a second communication part which communicates with an upper level apparatus; and a control part which determines whether the contactless data carrier is matched to a predetermined specification based on the communication result with the contactless data carrier through the first communication part, and allows the second communication part to transmit to the upper level apparatus information that the contactless data carrier is not matched to the predetermined specification using a clock signal and a data signal with a communication specification equal to that of a magnetic card reading apparatus if the control part determines the contactless data carrier is not matched to the predetermined specification.

By this structure, the information that the contactless data carrier is not matched to the predetermined specification can be transmitted to the outside using the clock signal and the data signal with the communication specification of the magnetic card reading apparatus.

Moreover, there is provided an information reading system comprising an information reading apparatus and an upper level apparatus for receiving information from the information reading apparatus. The information reading apparatus comprises a first communication part which wirelessly communicates with a contactless data carrier; a second communication part which communicates with the upper level apparatus; and a control part which determines whether a plurality of contactless data carriers exist in a communication range of the first communication part based on the communication result with the contactless data carrier, and allows the second communication part to transmit to the upper level apparatus information that the plurality of the contactless data carriers exist using a clock signal and a data signal with a communication specification equal to that of a magnetic card reading apparatus if the control part determines the plurality of the contactless data carriers exist. The upper level apparatus comprises a receiving part which receives a reading data and/or the information transmitted from the information reading apparatus; a notifying part which notifies the information; and a second control part which analyzes the information received from the information reading apparatus and allows the notifying part to notify the information if the second control part analyzes the information is the information that the plurality of the contactless data carriers exist.

By this structure, the information reading apparatus can transmit the information that the plurality of the contactless data carriers exist in the communication range to the outside using the clock signal and the data signal with the communication specification equal to that of the magnetic card reading apparatus, and the upper level apparatus can analyze the information received from the information reading apparatus and allow the notifying part to notify the information if the information is the information that the plurality of the contactless data carriers exist.

Further, there is provided an information reading system comprising an information reading apparatus and an upper level apparatus for receiving information from the information reading apparatus. The information reading apparatus comprises a first communication part which wirelessly communicates with a contactless data carrier; a second communication part which communicates with the upper level apparatus; and a control part which determines whether the contactless data carrier is matched to a predetermined specification based on the communication result with the contactless data carrier through the first communication part, and allows the second communication part to transmit to the upper level apparatus information that the contactless data carrier is not matched to the predetermined specification using a clock signal and a data signal with a communication specification equal to that of a magnetic card reading apparatus if the control part determines the contactless data carrier is not matched to the predetermined specification. The upper level apparatus comprises a receiving part which receives a reading data and/or the information transmitted from the information reading apparatus; a notifying part which notifies the information; and a second control part which analyzes the information received from the information reading apparatus and allows the notifying part to notify the information if the second control part analyzes the information is the information that the contactless data carriers is not matched to the predetermined specification.

By this structure, the information reading apparatus can transmit the information that the contactless data carrier is not matched to the predetermined specification to the outside using the clock signal and the data signal with the communication specification equal to that of the magnetic card reading apparatus, and the upper level apparatus can analyze the information received from the information reading apparatus and allow the notifying part to notify the information if the information is the information that the contactless data carrier is not matched to the predetermined specification.

BRIEF DESCRIPTION OF THE DRAWINGS

FIG. 15 is a block diagram illustrating a circuit construction of the second embodiment;

DETAILED DESCRIPTION OF THE PREFERRED EMBODIMENTS

First Embodiment

Hereinafter, a payment terminal apparatus (including an information reading apparatus and an information reading system) according to a first embodiment of the present invention will be described with reference to FIGS. 1 through 7.

Figure 1:
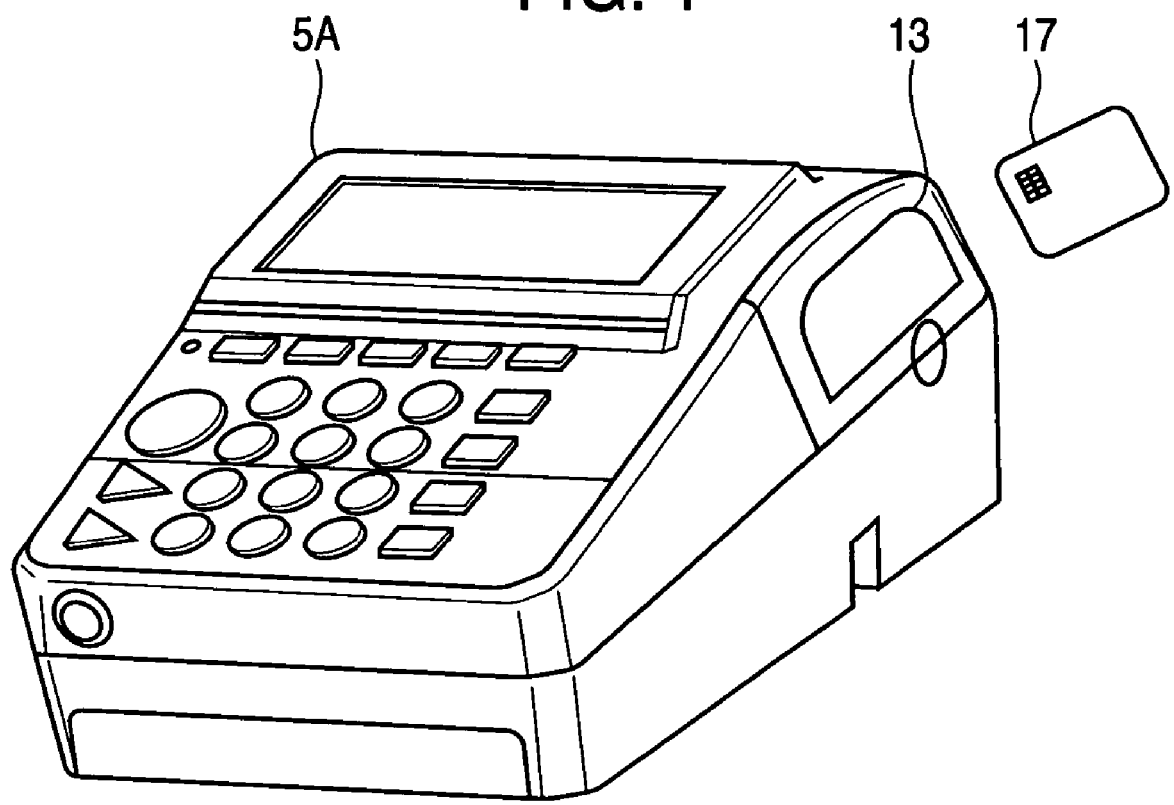
FIG. 1 illustrates a schematic view of an information reading system according to a first embodiment of the present invention.

FIG. 1 is a perspective view of a payment terminal apparatus 5A for processing payment using a payment card according to the present embodiment, and illustrates the state that a contactless smart card 17 which is an example of a contactless data carrier is held to an antenna 13 having a reading function.

Figure 2:
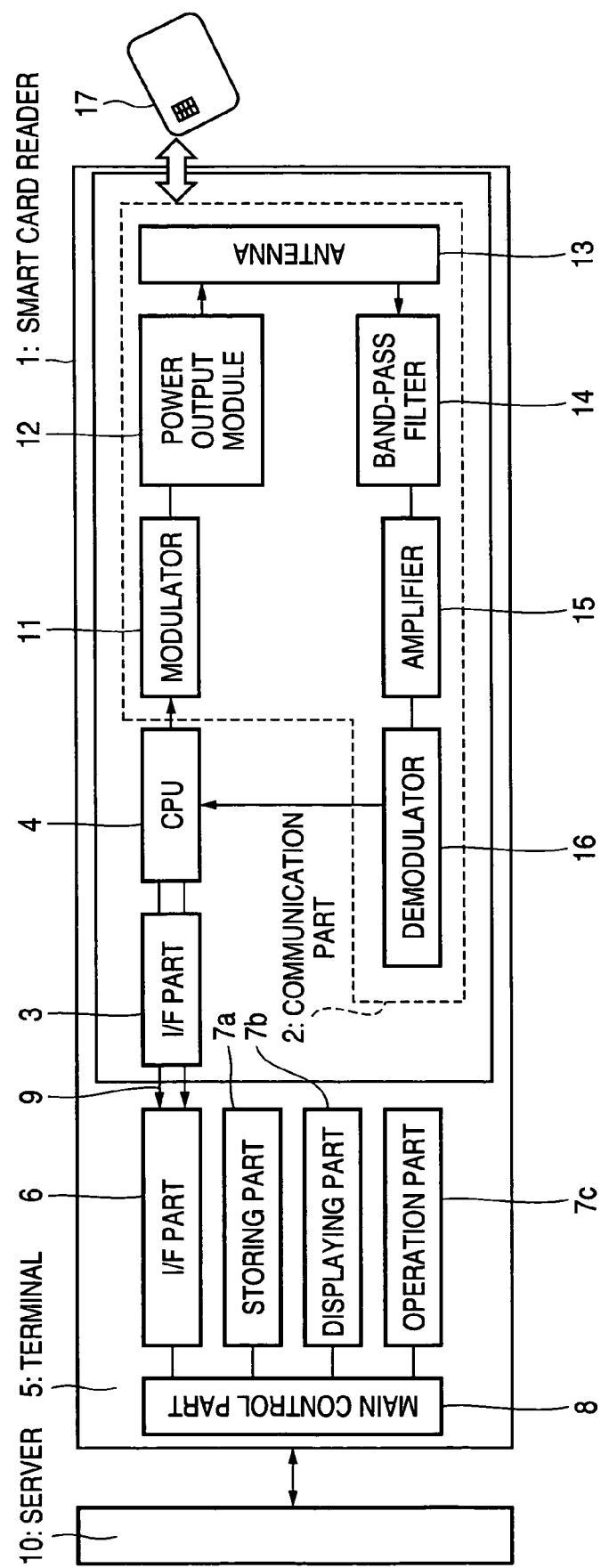
FIG. 2 is a functional block diagram of the first embodiment.

FIG. 2 is a functional block diagram of the present embodiment. This apparatus is largely divided into a smart card reader 1 part and a terminal 5 part. In the Figure, a reference numeral 1 denotes a smart card reader corresponding to the contactless smart card 17. The smart card reader 1 includes a communication part 2 wirelessly communicating with the contactless smart card 17, an I/F (interface) part 3 for transmitting information read by the communication part 2 to an upper level apparatus (the terminal 5) which is located in an upper level of communication flow in the apparatus, and a CPU (central processing unit) 4. The communication part 2 includes a modulator 11, a power output module 12, an antenna 13, a band-pass filter 14, an amplifier 15, and a demodulator 16.

Furthermore, the CPU 4 controls the entire function of the smart card reader 1, such as instruction issue to the contactless smart card 17 or data conversion of information received from the contactless smart card 17 and information transmission to the terminal 5. In the communication part 2, the modulator 11 modulates the instruction issued by the CPU 4 so as to a carrier frequency signal to transmit the instruction to the contactless smart card 17. The modulated signal is boosted to a required voltage or current by the power output module 12 and is output through the antenna 13. The band-pass filter 14 blocks a strong signal output from the power output module 12 and filters only a weak response signal which is output from contactless smart card 17 and received through the antenna 13. The response signal output from the contactless smart card 17 is amplified by the amplifier 15 connected to the band-pass filter 14, decoded by the demodulator 16, and sent to the CPU 4. Also, magnetic data image information 9 which is output from the I/F part 3 and includes a clock signal and a data signal is sent to the I/F part 6 of a terminal 5A interfacing with the smart card reader 1.

The magnetic data image information 9 obtained by converting the data read from the contactless smart card 17 into the data having the same format (data format) as the magnetic card by the CPU 4 is transmitted to the terminal 5A with the specification equal to the output specification of the magnetic card reader. As mentioned below, when the CPU 4 detects whether a plurality of contactless smart cards 17 exist in a communication range or the specification of the contactless smart card 17 is not matched to the communication specification, information representing the detected result is transmitted to the terminal 5A with a data format which is different from that of the magnetic card.

Here, the "communication specification" and the "output specification" are a communication method and an output method, respectively, and include an information communication protocol or formats of the communication and output information.

On the other hand, the terminal 5A which is in a level higher than the smart card reader 1 includes an I/F part 6 which receives the magnetic data image information 9 including the clock signal and the data signal supplied from the smart card reader 1, a storing part 7a for storing various information, a displaying part 7b for displaying the received information, an operation part 7c for inputting various information by a user, a main control part 8 for determining whether the magnetic data image information 9 is a data read from the contactless smart card 17 or information representing the state of the contactless smart card 17 and notifying the information to a notifying part 7 when the magnetic data image information 9 is the information representing the state of the contactless smart card 17. The main control part 8 controls the operations of the parts in the terminal 5A. Also, the determination or notification performed by the terminal 5A will be described later. Further, the terminal 5A is connected to a server 10 provided in a center through a network, and credit inquiry of card information or sale process is performed in the server 10 through the network based on the card data input to the I/F part 6.

Figure 3:
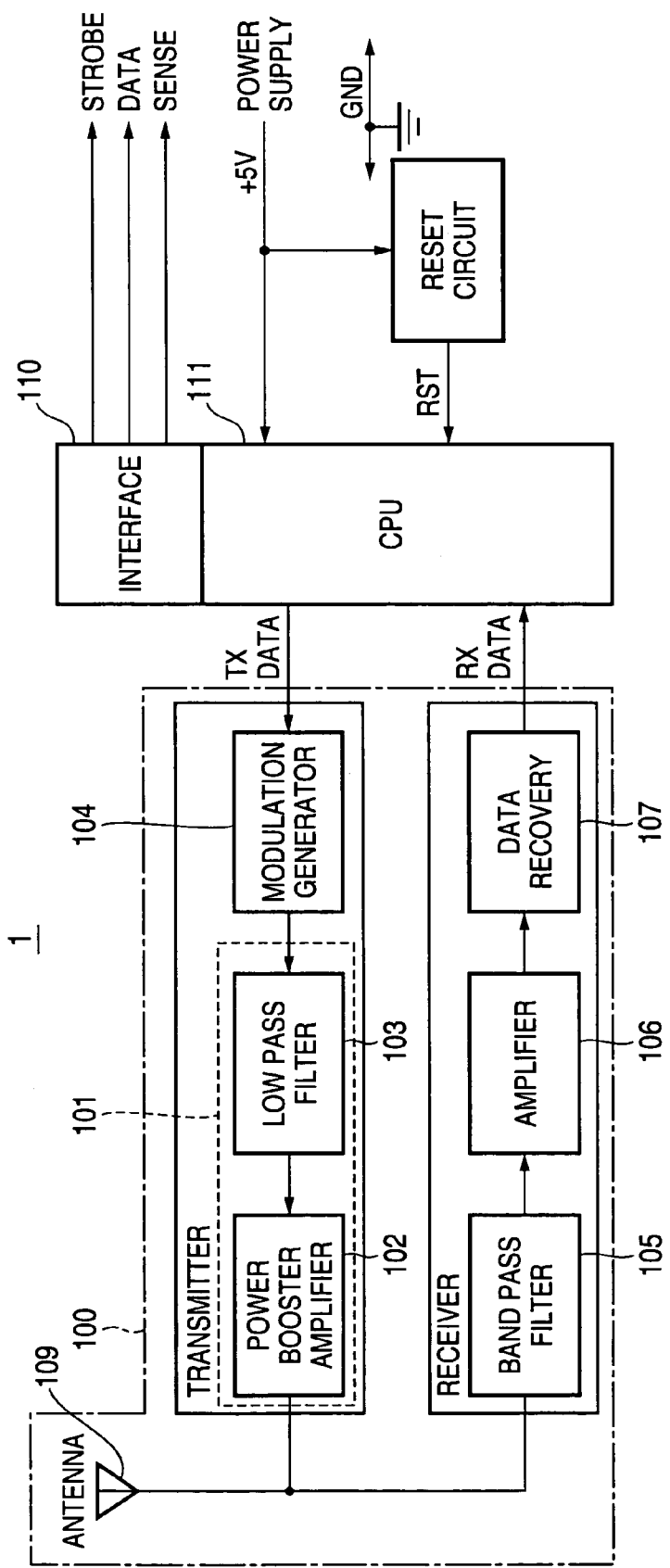
FIG. 3 is a block diagram illustrating a circuit construction of the first embodiment.
Figure 4:
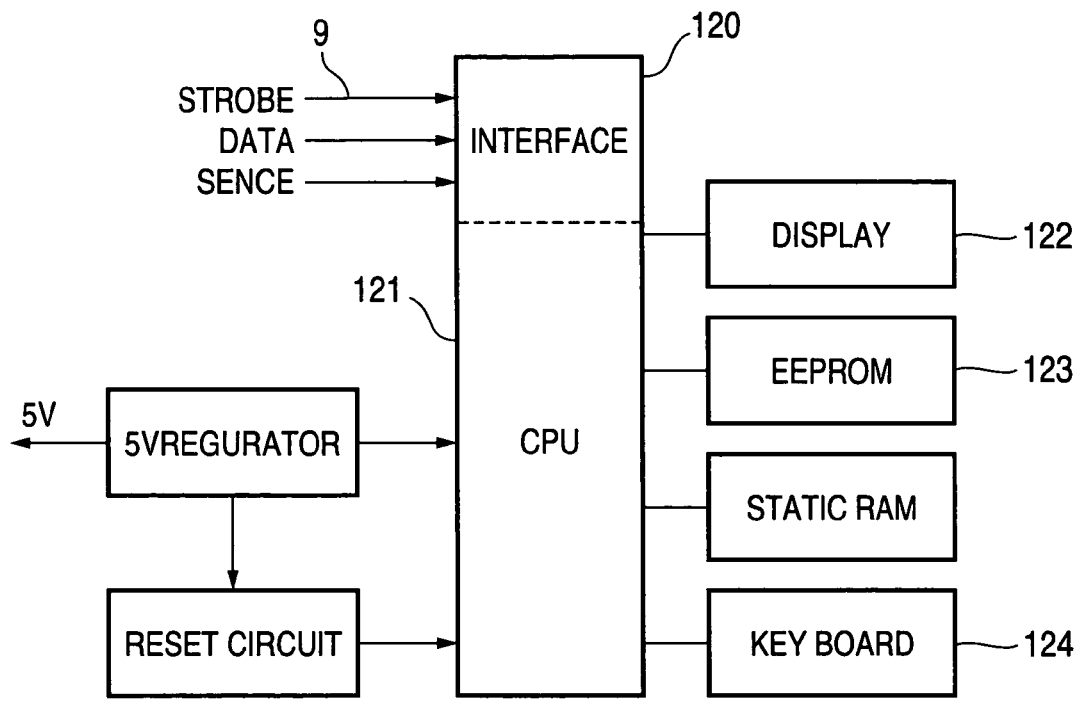
FIG. 4 is a block diagram illustrating a circuit construction of the first embodiment.

FIGS. 3 and 4 are block diagrams illustrating a circuit construction of the smart card reader 1 and the 5 according to the present embodiment, and the corresponding relationship between FIGS. 3 and 4 and FIG. 2 will now be described.

First, in FIGS. 2 and 3, the communication part 2 corresponds to a transmitter part, a receiver part, and an antenna 109, which are denoted by a reference numeral 100. The I/F part 3 correspond to an interface 110, the CPU 4 corresponds to a CPU 111, the modulator 11 corresponds to a modulation generator 104, and the power output module 12 corresponds to a power booster amplifier 102 and a low pass filter 103. Further, the band-pass filter 14 corresponds to a band-pass filter 105, the amplifier 15 corresponds to an amplifier 106, and the demodulator 16 corresponds to a data recovery 107. In FIGS. 2 and 4, the I/F part 6 corresponds to an interface 120, the storing part 7a corresponds to an EEPROM 123, the displaying part 7b corresponds to a display 122, and the operation part 7c corresponds to a keyboard 124.

Figure 5:
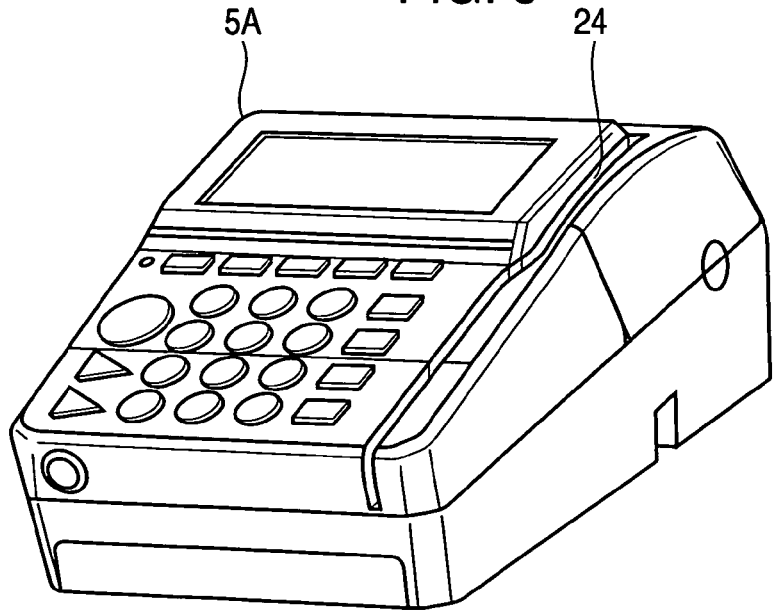
FIG. 5 is a perspective view of the information reading system of the first embodiment in which a smart card reader is substituted with a magnetic card reader.
Figure 6:
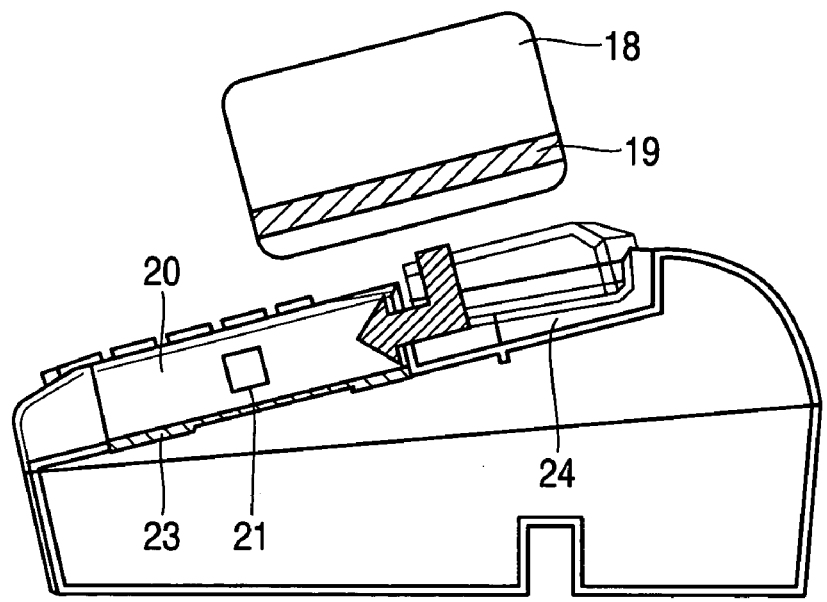
FIG. 6 is a side view of the information reading system of the first embodiment in which the smart card reader is substituted with the magnetic card reader.
Figure 7:
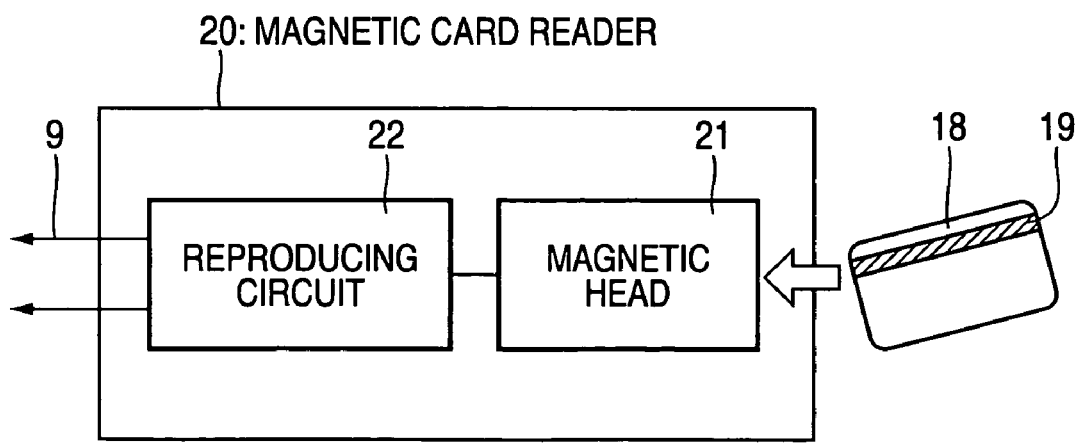
FIG. 7 is a functional block diagram of the information reading system of the first embodiment in which the smart card reader is substituted with the magnetic card reader.

A payment terminal apparatus for processing the payment using a payment smart card is used as an example of the terminal 5A, as mentioned above. In order to describe the present embodiment in detail, a payment terminal apparatus employing a magnetic card reader 20 for reading information of a magnetic card 18 instead of the smart card reader 1 will be described with reference to FIGS. 5 and 6. FIG. 5 is a perspective view of the payment terminal apparatus and FIG. 6 is a cross-sectional view of a main part of the payment terminal apparatus. FIGS. 5 and 6 illustrate the state that the magnetic card reader 20 for reading the magnetic card is mounted in the terminal 5A which is the payment terminal apparatus. The magnetic card reader 20 includes a magnetic head 21 for reading the information of the magnetic card 18 and a reproducing circuit 22 for processing the information read from the magnetic head 21 and sending it to the terminal 5A, as shown in FIG. 7. Also, the reproducing circuit 22 converts an analog signal reproduced from a magnetic band 19 on the magnetic card 18 by the magnetic head 21 into a digital signal and outputs the digital signal.

Next, the process of the terminal 5A including the magnetic card reader 20 for reading the information of the magnetic card 18 will be described. The magnetic card reader 20 shown in FIG. 3 is mounted in this terminal 5A, instead of the smart card reader 1 shown in FIG. 1.

Figure 8:
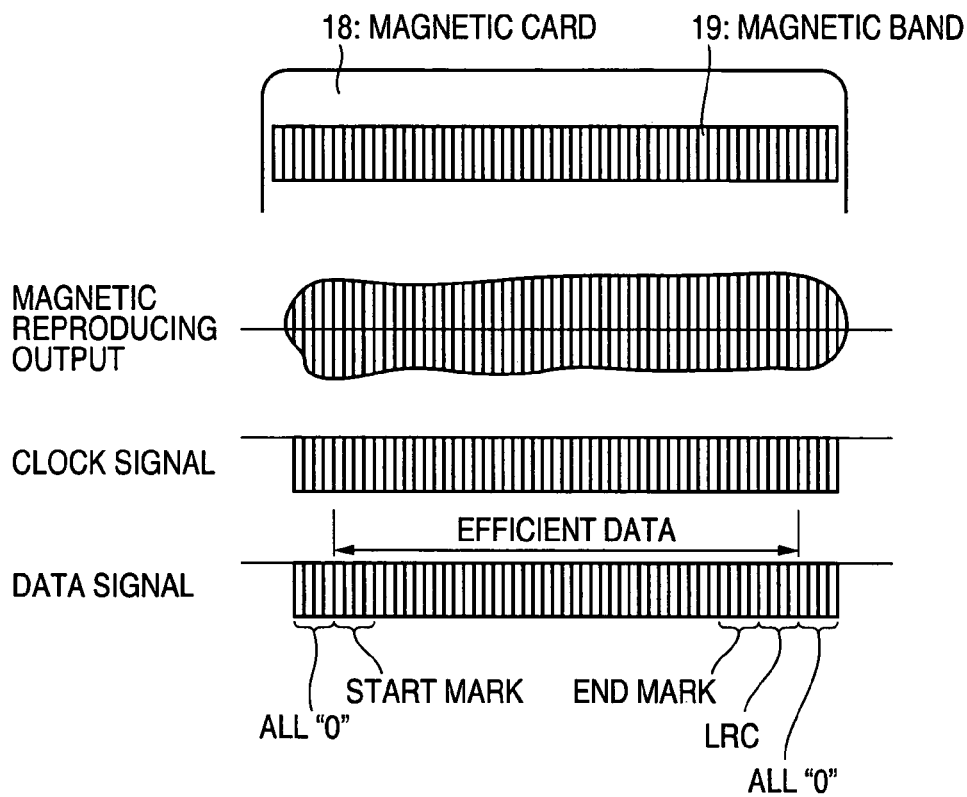
FIG. 8 illustrates signals of parts in the magnetic card reader of the first embodiment.
Figure 9:
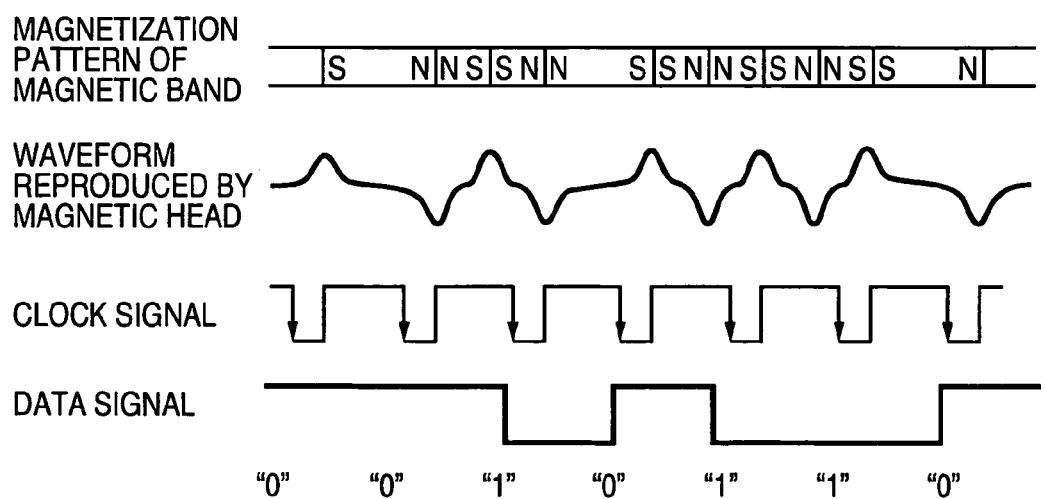
FIG. 9 is a timing chart of enlarging a portion of the signals of the parts in the magnetic card reader of the first embodiment.

As shown in FIG. 5, when the magnetic card 18 slides along a travel guide 23 of a card travel guide groove 24 formed in the terminal 5A, the magnetic head 21 provided in the magnetic card reader 20 is pressed to and contact with the magnetic band 19 of the magnetic card 18 to reproduce a magnetic write data of the magnetic card 18. The waveform of the data reproduced by the magnetic head 21 is divided into a clock signal (data identifying timing signal) and a data signal and is output. FIG. 8 illustrates signals of the parts, and FIG. 9 is a timing chart of enlarging a portion of the signals of the parts. The information of the magnetic card 18 read by the magnetic card reader 20 having a read function of the magnetic card 18 is transmitted to the terminal 5A as the clock signal and the data signal which are communication specification of the magnetic card reading apparatus.

The operation of the present embodiment using the smart card reader will be described with reference to FIGS. 1 through 12.

In FIG. 2, the CPU 4 of the smart card reader 1 issues a transmission instruction to the contactless smart card 17 over time and periodically determines whether the contactless smart card 17 exists in the communication range of the antenna 13. When the contactless smart card 17 approaches the antenna 13, the antenna 13 receives a response output from contactless smart card 17 and transmits the response to the CPU 4. The CPU 4 transmits instructions to the contactless smart card 17 according to a predetermined communication sequence and reads/writes the information from/to the contactless smart card 17. The CPU 4 converts the information received from the contactless smart card 17 into the clock signal and the data signal so that the specification thereof is equal to the output specification of the reproducing circuit 22 of the magnetic card reader 20 shown in FIGS. 5 and 6, and sequentially outputs all "0", a start mark, a data, an end mark, a LRC (longitudinal redundancy check character), and all "0". Also, the converted data is transmitted to the terminal 5A through the I/F part 3.

When the main control part 8 of the terminal 5A determines the data input to the I/F part 6 to the data of contactless smart card 17 as mentioned below, the terminal 5A can perform the credit inquiry of the card information or the sale process to the server 10 through the network based on the received card data, similar to the conventional card system for the magnetic card. Further, since the data of the contactless smart card 17 input to the I/F part 6 is converted so that the format thereof is equal to the data format of the magnetic card 18, the network environment of the magnetic card system which is already provided can be used without the change and the network for using the contactless smart card 17 need not be specially changed.

Next, a case that a plurality of contactless smart cards 17 are simultaneously held in the communication range of the antenna 13 will be described.

Here, as an example of bit encoding, an encoding method which defines a bit value by the level change (rising edge or falling edge) in a bit window is used. In this method, when the state "no change" exists in the bit window, an error is recognized to be generated.

Figure 10:
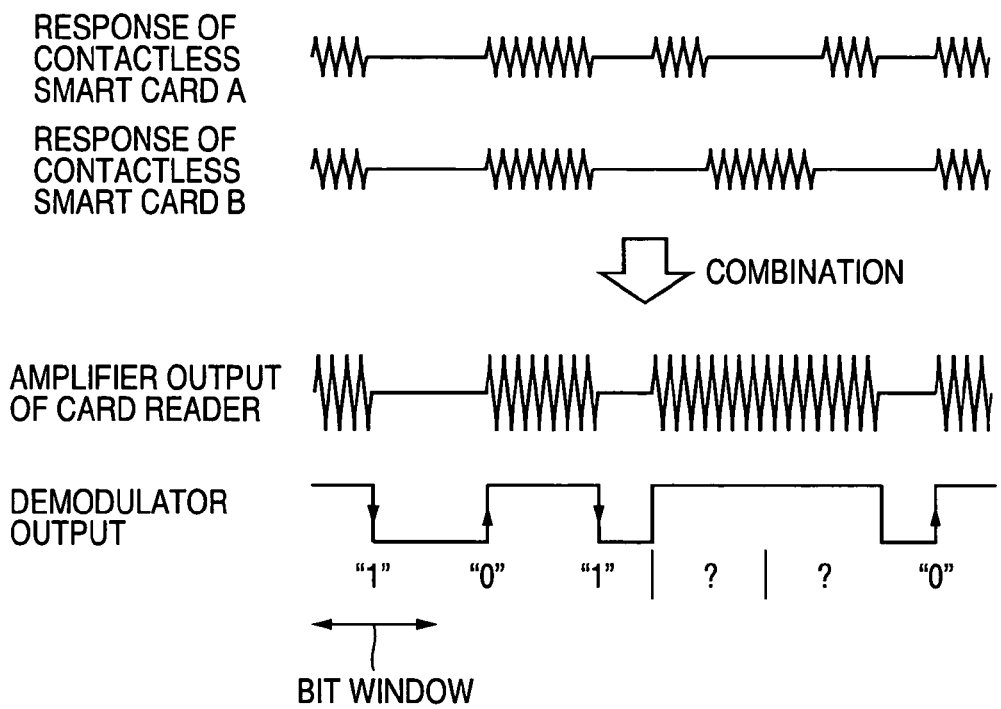
FIG. 10 illustrates signals output when collision is caused upon the communication with a contactless smart card in the first embodiment.

As shown in FIG. 10, when two contactless smart cards 17 simultaneously exist in the communication range of the antenna 13, the two contactless smart cards 17 receive the transmission instruction output from the CPU 4 and simultaneously respond. At this time, when the two contactless smart cards 17 transmit different bit values, the signal output from the amplifier 15 of the smart card reader 1 becomes the state of overlapping the two signals. Also, the positive and negative bits are cancelled each other and thus the output of the demodulator 16 becomes the state "no change" in the bit window. Thus, the CPU 4 can recognize that the plurality of the contactless smart cards 17 exist in the communication range of the antenna 13.

Moreover, by repeatedly performing a shock absorbing algorithm to identify identifications such as unique production number of the contactless smart cards 17 held in the communication range of the antenna 13, it can be determined whether the plurality of the contactless smart cards 17 exist.

Next, as an example that the contactless smart card 17 is not matched to the predetermined specification of the present embodiment, a case that a different kind of the contactless smart card 17 is held in the communication range of the antenna 13 will be described.

Generally, when the data is read and/or written from/to the card reader which is not authenticated, failure may be generated. Accordingly, the access which is not authenticated for the contactless smart card 17 is protected using several methods. Here, as an example of the protection, an authentication procedure using private key is used.

When the contactless smart card 17 is held in the communication range of the antenna 13, communication is established between the smart card reader 1 and the contactless smart card 17. Thereafter, an instruction "authentication initiation" is transmitted from the CPU 4 to the contactless smart card 17. The contactless smart card 17 receives this instruction, generates a random number A, carries the random number in a response signal, and transmits the response signal to the smart card reader 1.

Next, the CPU 4 of the smart card reader 1 which receives the response signal from the contactless smart card 17 generates a random number B, and generates an encrypted data block using a public key and a public key algorithm, and transmits this data block to the contactless smart card 17. Also, the data block includes two random numbers (random number A and random number B). The contactless smart card 17 which receives the data block from the smart card reader 1 decodes the data block, extracts the random number A from the data block, and compares the extracted random number with its own random number A. When the random numbers are equal to each other, the contactless smart card 17 recognizes that the both public keys are equal to each other.

Next, the contactless smart card 17 generates another random number C, adds the random number B included in the received data block to the random number C to generate an encrypted data block, and transmits this data block to the smart card reader 1. The CPU 4 of the smart card reader 1 which receives the data block from the contactless smart card 17 decodes the data block, extracts the random number B from the data block, and compares the extracted random number with its own random number B. When the random numbers are equal to each other, the CPU 4 recognizes that the both public keys are equal to each other. Thus, it can be recognized that the smart card reader 1 and the contactless smart card 17 belong to the same application and thus the smart card reader 1 can access the contactless smart card 17.

However, in the case of the different kind of the contactless smart card 17, the random number B included in the decoded data block is different from its own random number, and thus the CPU 4 can recognize that the contactless smart card 17 is not matched to the predetermined specification.

Also, as another method for the recognition, when the contactless smart card 17 does not correspond to a necessary instruction (at this time, a response signal for the instruction is not generated), when the response of the contactless smart card 17 for the instruction is different from the expected result, or when necessary information is not stored in the application data in the contactless smart card 17, it is recognized that the contactless smart card 17 is not matched to the expected specification.

Next, when the contactless smart card 17 is accurately processed, when the plurality of the contactless smart cards 17 exist in the communication range of the antenna 13, or when the contactless smart card 17 which exists in the communication range of the antenna 13 is not matched to the expected specification, examples of the data formats of the magnetic data image information 9 transmitted from the smart card reader 1 to the terminal 5A and a method of analyzing the information in the terminal 5A will be described.

Figure 11A:
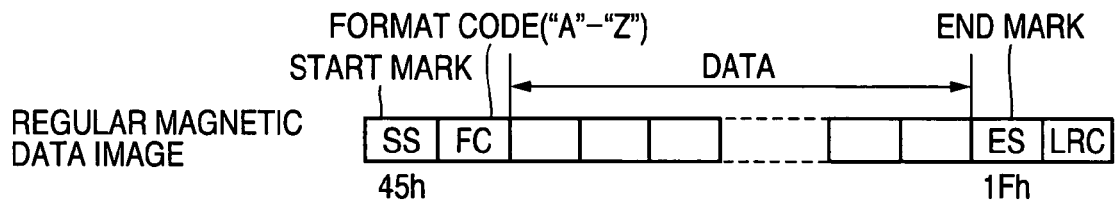
FIGS. 11A, 11B and 11C illustrate examples of magnetic data image information of the first embodiment.
Figure 11B:
Figure 11C:
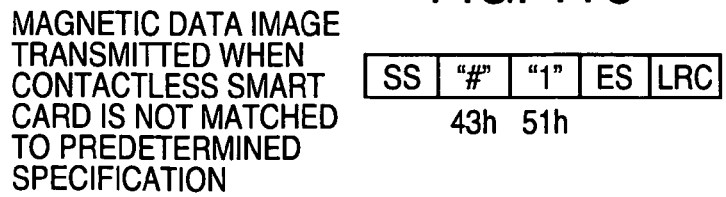

FIG. 6 illustrates an example of the data format of the magnetic data image information 9 output from the I/F part 3 of the smart card reader 1 to the terminal 5A based on the result of communicating with the contactless smart card 17, and FIG. 11A illustrates the data format when the contactless smart card 17 is accurately processed, FIG. 11B illustrates the data format when the plurality of the contactless smart cards 17 exist in the communication range of the antenna 13, and FIG. 11C illustrates the data format when the contactless smart card 17 is not matched to the predetermined specification.

Also, the magnetic data image information 9 is transmitted with the data format of the track 1 of the write specification which is determined in an international standard of the smart card. In the track 1, the cipher next to the start mark is allocated with a format code and is expressed by alphabets "A" to "Z".

Here, as shown in FIGS. 11B and 11C, in the case of the information representing the state of the contactless smart card 17 which exists in the communication range, the CPU 4 which generates the magnetic data image information 9 uses a character (for example, "#", etc.) except the alphabet as the format code so as to distinguish the information from the data of the contactless smart card 17 shown in FIG. 1. Further, the content represented by the information can be identified by the character next to the format code. For example, the character next to the format code is set to "2" as the identification information when the plurality of the contactless smart cards 17 exist in the communication range, and is set to "1" when the contactless smart card 17 is not matched to the predetermined specification to be transmitted from the smart card reader 1 to the terminal 5A. The information that the contactless smart card 17 is not matched to the predetermined specification when the character next to the format code is "1" and the information that the plurality of the contactless smart cards 17 exist in the communication range when the character next to the format code is "2" is previously stored in the storing part 7a of the terminal 5A. The main control part 8 of the terminal 5A analyzes the information transmitted from the smart card reader 1 and identifies the content represented by the information transmitted from the smart card reader 1 using the information stored in the storing part and the analyzed information.

When the magnetic data image information 9 has a data format different from that of the magnetic card 18, it can be considered that the start mark is set to a separate code different from the code standard. In the case of the regular magnetic data image information 9, the start mark is represented by 45 h (hexadecimal mark) containing a parity bit. The start card is set to 7 Fh to remarkably reduce the probability that the data formats are identical with each other in a house card used in a defined region, such as a membership card.

Moreover, instead of the start mark, the code of the end mark may be changed to a separate code different from the code standard of the magnetic card or both the start mark and the end mark may be changed to separate codes. Also, the algorithm of calculating the longitudinal redundancy check character can be changed.

The magnetic data image information 9 generated when the plurality of the contactless smart cards 17 exist in the communication range of the antenna 13 and the magnetic data image information 9 generated when the contactless smart card 17 is not matched to the predetermined specification has the same data format, but may have different data formats. Also, the number of the characters is not limited to 5 and may exceed the standard of the magnetic card 18.

Figure 12:
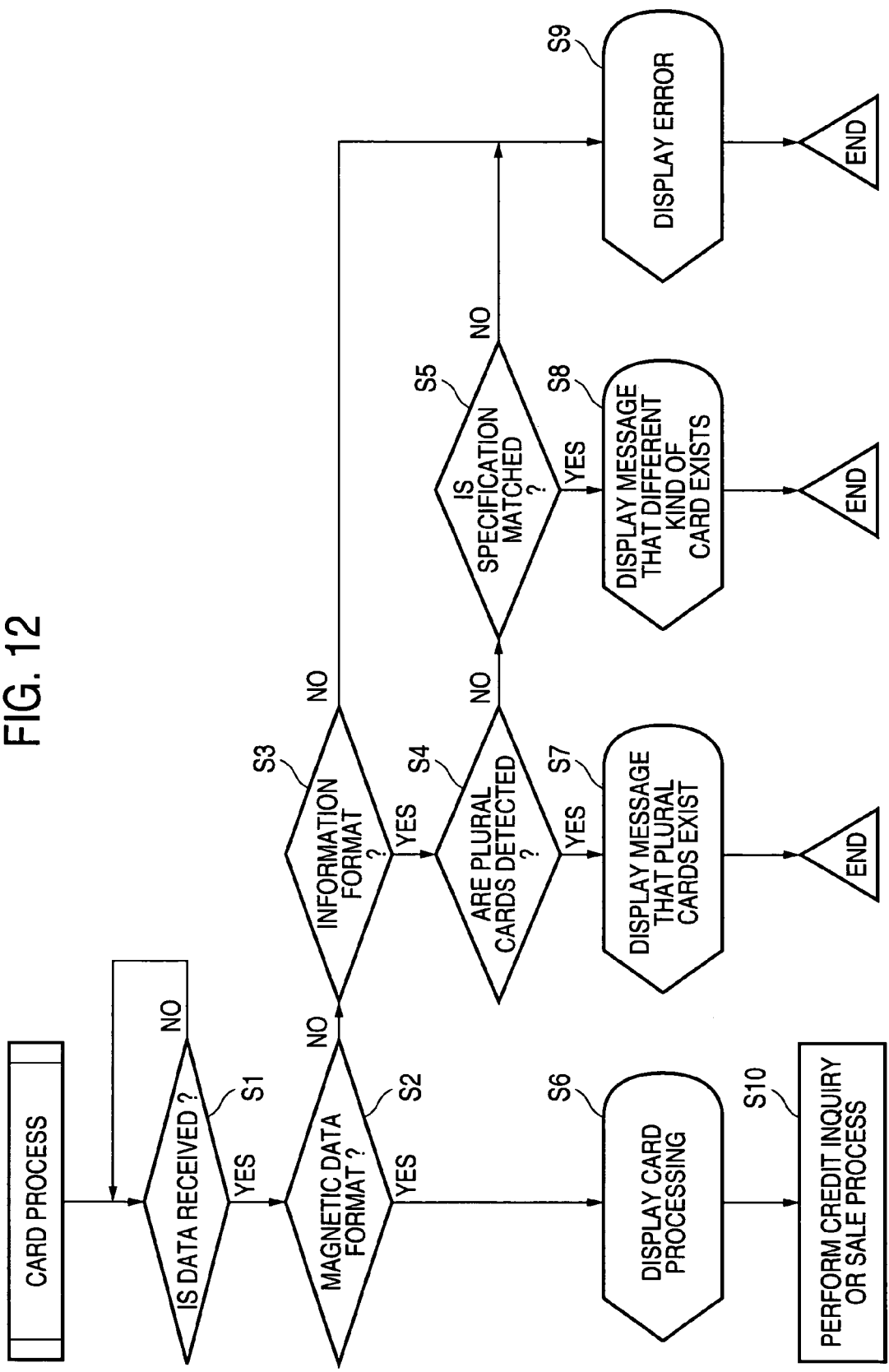
FIG. 12 is a flowchart schematically illustrating a card process of the first embodiment.

Next, the process performed when the terminal 5A receives the magnetic data image information 9 output from the I/F part 3 will be described with reference to the flowchart of FIG. 12.

The format of the magnetic data and the format of the information representing the state of the contactless smart card 17 are stored in the storing part of the terminal 5A as information, and the main control part 8 of the terminal 5A compares the previously provided format with the format of the magnetic data image information 9 including the clock signal and the data signal input to the I/F part 6 so that the magnetic data image information 9 input to the I/F part 6 is identified. Also, the notifying part 7 of the terminal 5A notifies a user or an operator of the communication state with the contactless smart card 17 based on the identified result. As the example of the notifying part 7, there is a display apparatus such as LCD for visually displaying a message.

Hereinafter, an example of notifying the communication state with the contactless smart card 17 will be described with reference to FIG. 12.

First, the main control part 8 of the terminal 5A determines whether the I/F part 6 receives a data when the card process is admitted (step S1). When the data is received, the process waits until the data is completely received and the format of the received data is compared (step S2 and step S3). When the format of the received data is matched to the format of the regular magnetic data shown in FIG. 11A, the display apparatus which is the notifying part 7 of the terminal 5A displays a message which notifies the processing (step S6) and the credit inquiry of the card information or the sale process is performed (step S10).

On the other hand, when the data which is received at the I/F part 6 is determined to be the information representing the state of the contactless smart card 17, the detailed content is analyzed (step S4 and step S5). When the received data is matched to the data format shown in FIG. 11B, the display apparatus 7 displays a message that the plurality of the contactless smart cards 17 exist in the communication range to notify the user (step S7). Also, when the data which is received at the I/F part 6 is matched to the data format shown in FIG. 11C, the display apparatus 7 displays a message that the contactless smart card 17 cannot be used to notify the user (step S8).

Furthermore, when the received data is not matched to any format, the display apparatus 7 displays a message that the card operation is prompted to notify the user (step S9).

In the present embodiment, by notifying the read state of the contactless smart card 17, the user or the operator of the contactless smart card 17 can know the current state related to the communication with the contactless smart card 17. For example, when the message that the contactless smart card 17 cannot be used is notified, a card which cannot be used is removed or is substituted with a card which can be used.

The notifying part 7 may be a lamp such as a LED or a means for making a sound or a melody.

Although, in the present embodiment, the smart card reader 1 processes only the contactless smart card 17, it may process a plurality of the cards such as a contactless data carrier, a magnetic card, and a contact smart card.

Moreover, although, in the present embodiment, the smart card reader 1 is mounted in the terminal 5A, the present invention is not limited to this. That is, the smart card reader 1 and the terminal 5A may be separately provided and the smart card reader 1 may be connected to the terminal 5A as an external apparatus. In this case, a notifying part may be also provided in the smart card reader 1 so that the notification can be performed by the smart card reader 1. Also, the notifying part may be provided in any one of the terminal 5A and the smart card reader 1 so that the notification can be performed by any one of the terminal 5A and the smart card reader 1.

Although, in the present embodiment, the state of the contactless data carrier 17 located in the communication range is divided into the state that the plurality of the contactless smart cards 17 exist in the communication range of the antenna 13 or the state that the contactless smart card 17 is not matched to the predetermined specification, the state may be more divided in detail to transmit the information to the terminal 5A. Further, information that any contactless smart card 17 does not exist in the communication range may be transmitted to the terminal 5A and notified by the terminal 5A.

Second Embodiment

Figure 13:
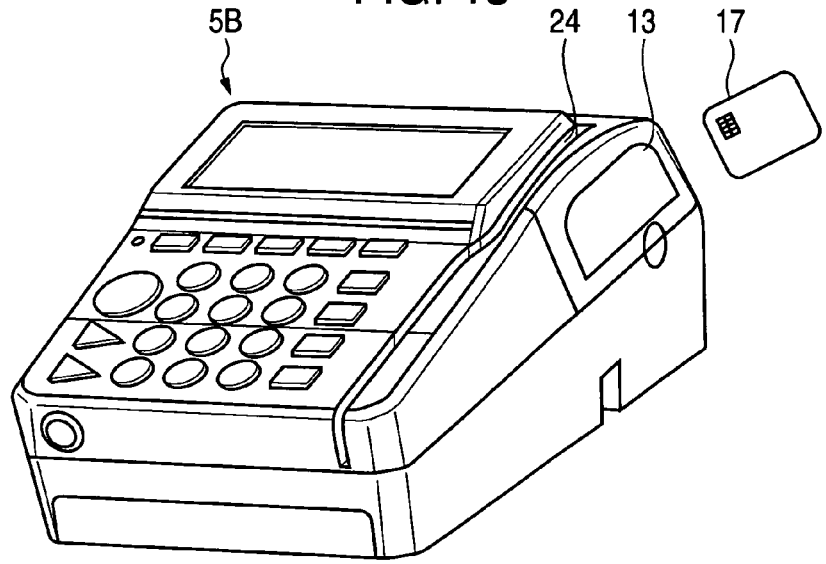
FIG. 13 illustrates a schematic view of an information reading system according to a second embodiment of the present invention.
Figure 14:
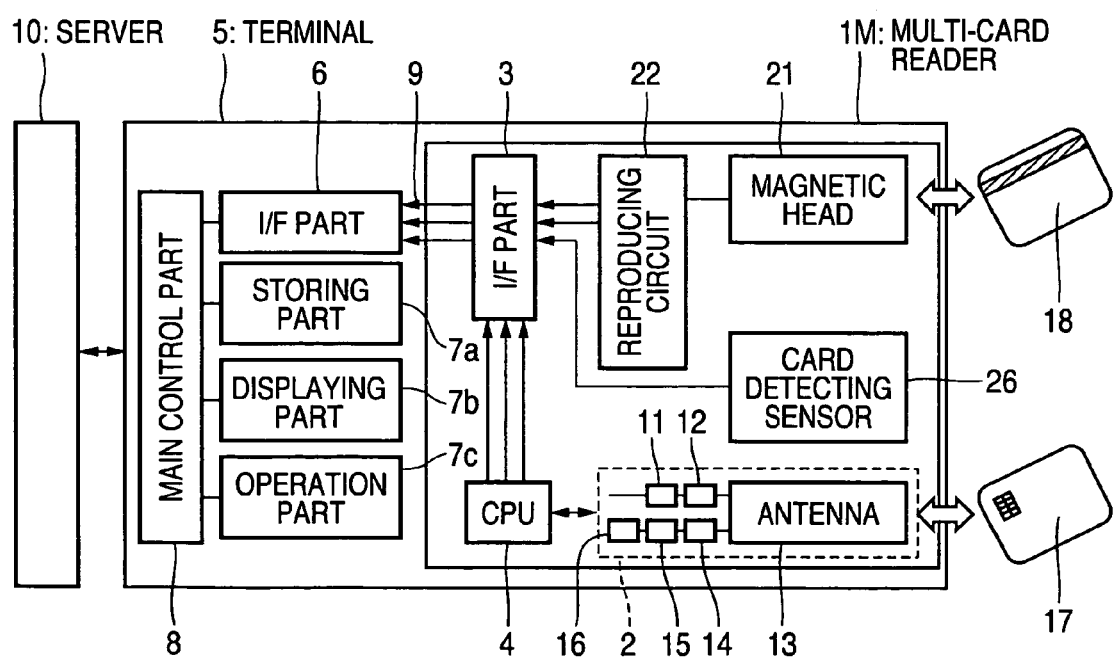
FIG. 14 is a functional block diagram of the second embodiment.

FIG. 13 illustrates a schematic view of a payment terminal apparatus according to a second embodiment of the present invention, and FIG. 14 is a functional block diagram of the payment terminal apparatus 5B.

In the present embodiment, the same portions as the first embodiment are denoted by the same reference numerals and their description will be omitted. The present embodiment is different from the first embodiment in that a multi-card reader 1M is a complex card reader for processing both the magnetic card 18 and the contactless smart card 17 and an output signal of a card detecting sensor 26 is also output from the I/F part 3 of the multi-card reader 1M to the terminal 5B.

Furthermore, the I/F part 3 of the multi-card reader 1M also serves as a signal selector for determining whether the information read by the magnetic head 21 is output to the terminal 5B or whether the information based on the information received by the antenna 13 is output to the terminal 5B based on a control signal (not shown) output from the CPU 4. The information read by the magnetic head 21 and the output signal of the card detecting sensor 26 are generally output to the terminal 5B. However, when the CPU 4 receives the information from the contactless smart card 17 through the antenna 13 and the I/F part 3 receives the signal that the CPU 4 outputs the communication result with the contactless smart card 17 to the terminal 5B, the signal of the card detecting sensor which is similar to the output signal of the card detecting sensor 26 generated by the CPU 4 and the magnetic data image information 9 including the clock signal and the data signal are output to the terminal 5B.

FIG. 15 is a block diagram illustrating a circuit construction of the present embodiment. Hereinafter, portions corresponding to the functional block diagram of FIG. 14 will be described. The communication part 2 corresponds to a component part 200 having a transmitter part, a receiver part, and an antenna 208, the I/F part 3 correspond to a multiplexer 210, the CPU 4 corresponds to a CPU 211, the modulator 11 corresponds to a modulation generator 204, and the power output module 12 corresponds to a component part 201 having a power booster amplifier 202 and a low pass filter 203, the band-pass filter 14 corresponds to a band-pass filter 205, the amplifier 15 corresponds to an amplifier 206, and the demodulator 16 corresponds to a data recovery 207. The magnetic head 21 corresponds to a magnetic head 220, the reproducing circuit 22 corresponds to a decode circuit, and the card detecting sensor 26 corresponds to a component part 224 having a card detection switch 222 and a switch trigger 223.

Hereinafter, the operation of the second embodiment will be described.

In the present embodiment, there are the cases that the magnetic card 18 is inserted into the multi-card reader 1M and the contactless smart card is held in the multi-card reader 1M. At this time, since the card process is equal to the flowchart shown in FIG. 12, its description will be omitted.

Figure 16A:
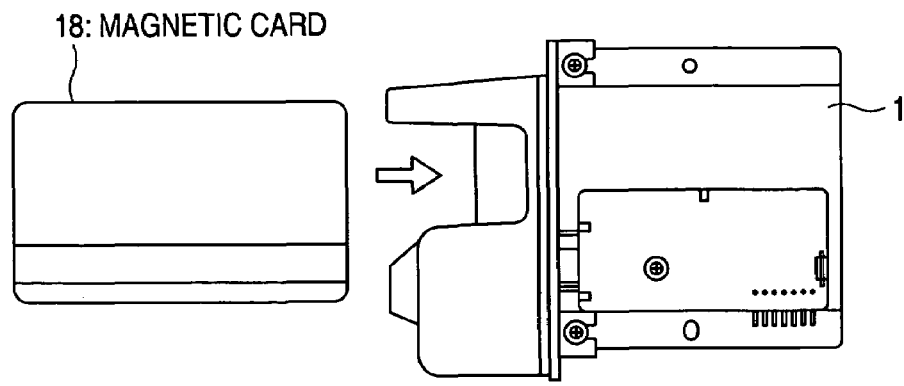
FIGS. 16A and 16B illustrate insertion of a magnetic card of the second embodiment.
Figure 16B:
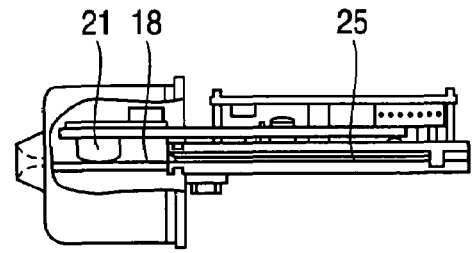

Further, the multi-card reader 1M of the present embodiment on which the card detecting sensor 26 is mounted is a slot type card reader and FIG. 16 is a schematic diagram illustrating the structure of the slot type card reader. FIG. 16A illustrates the state before the magnetic card 18 is inserted and FIG. 16B illustrates the state that the magnetic card 18 is completely inserted. Moreover, the card detecting sensor 26 is not shown in FIG. 16, but is formed in the inside of a card reception box 25 to determine whether the magnetic card 18 is completely inserted into the card reception box 25. Also, the card detecting sensor 26 includes a light emitting part for emitting light and a light receiving part for receiving light emitted from the light emitting part. When the magnetic card 18 is completely inserted, the light emitted from the light emitting part is blocked by the magnetic card 18 and thus the light receiving part cannot receive the light. Thus, it is determined that the magnetic card 18 is completely inserted.

Figure 17:
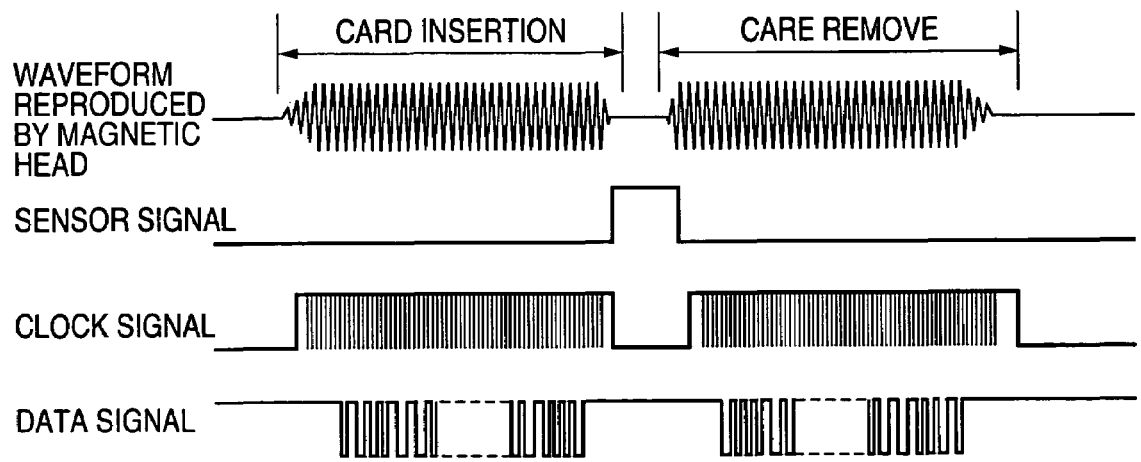
FIG. 17 illustrates examples of signals output when the magnetic card operates in the second embodiment.

FIG. 17 illustrates signals of the parts which are output by a series of operations of inserting and removing the magnetic card 18 into and from the card reception box 25 of the multi-card reader 1M. Also, since the clock signal and the data signal are output when the magnetic card 18 slides in the state that the magnetic head 21 attached to the multi-card reader 1M and the magnetic band 19 of the magnetic card 18 contact with each other, they are output when the magnetic card 18 moves, that is, when the magnetic card 18 is inserted or removed, but are not output when the output signal of the card detecting sensor 26 representing that the magnetic card 18 is completely inserted (stopped) is active (in a high period).

Figure 18A:
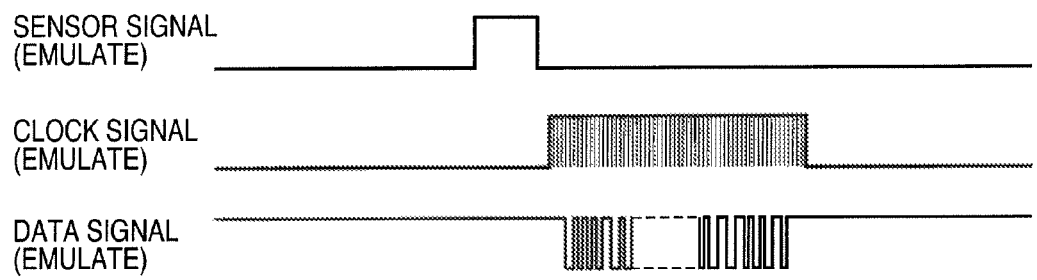
FIGS. 18A and 18B illustrate examples of signals generated when a data of a contactless smart card is output in the second embodiment.
Figure 18B:
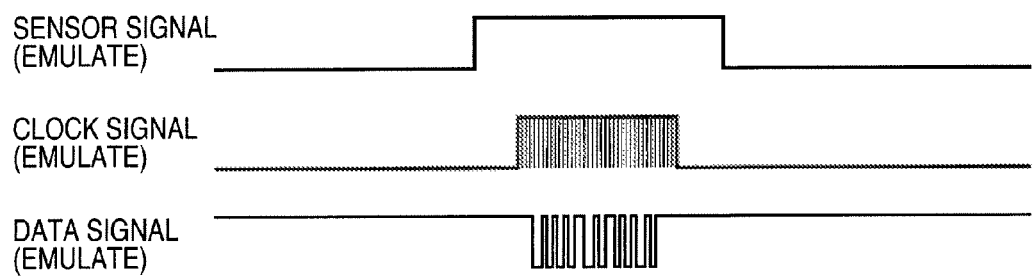
Figure 19:
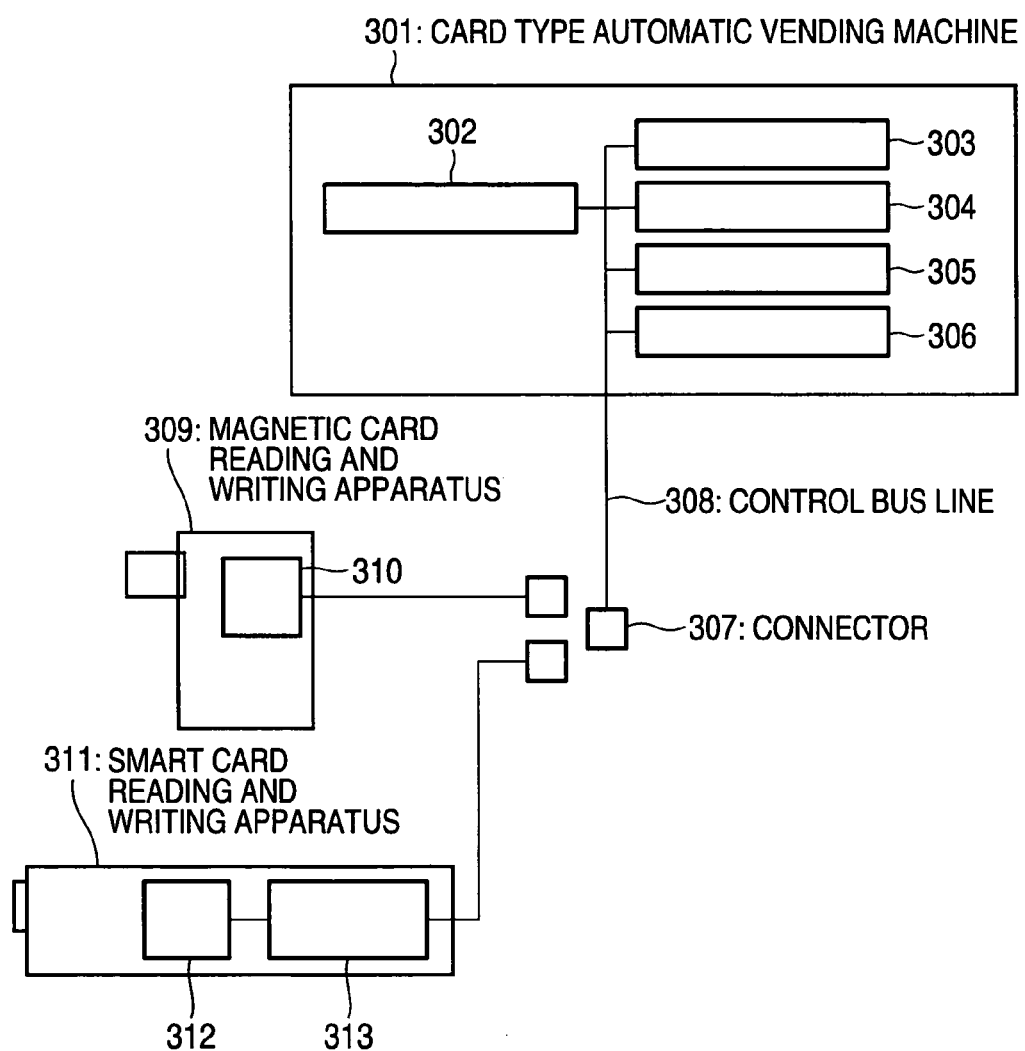
FIG. 19 illustrates a schematic diagram of a card type automatic vending machine connected with a conventional smart card reading and writing apparatus.

FIG. 18 illustrates signals which are generated at the CPU 4 of the multi-card reader 1M based on the communication result with the contactless smart card 17 and output from the I/F part 3 of the multi-card reader 1M to the terminal 5B. FIG. 18A illustrates an example of the signals generated when the data of the contactless smart card 17 which is accurately read is output and FIG. 18B illustrates an example of the signals generated when the information representing the abnormal state of the contactless smart card 17 is output. Since the magnetic card 18 is read in the state that the card is completely inserted into the card reception box 25, the data of the contactless smart card 17 having the same specification as the communication specification of the magnetic card emulates the signal waveform generated when the card is removed. As shown in FIG. 18A, the clock signal and the data signal are output when the sensor signal which is the output signal of the card detecting sensor 26 is non-active (in a low period).

On the other hand, in the timing chart when the information representing the communication state with the contactless smart card 17 is output, at a timing which cannot be generated when the magnetic card operates, that is, when the sensor signal which is the output signal of the card detecting sensor 26 is active (in the high period) as shown in FIG. 18B, the clock signal and the data signal are output so that it is distinguished from the case that the data of the contactless smart card 17 is output.

Moreover, in the present embodiment, the timing chart of the case that the data of the contactless smart card 17 is transmitted and the timing chart of the case that the information representing the state of the contactless smart card 17 is transmitted are previously provided to the terminal 5B as information, and the main control part 8 of the terminal 5B compares the previously provided timing chart with the timing chart of the signals input to the I/F part 6 so that the magnetic data image information 9 input to the I/F part 6 is identified. If abnormality is generated, the notifying part 7 notifies the operator.

Although the signal waveform at the time of removing the card is emulated in the timing chart of the case that the normal data of the contactless smart card 17 is output, the signal waveform at the time of inserting the card may be emulated or the signal waveforms at the time of inserting and removing the card may be emulated. The format of the information representing the state of the contactless smart card 17 may be different from that of the data of the contactless smart card 17, similar to the first embodiment. Although, in the present embodiment, the smart card reader 1 processes both the magnetic card 18 and the contactless smart card 17, it processes only the contactless smart card 17 or only the other data carrier.

As mentioned above, according to the present embodiment, in the connection between the smart card reader 1 and the terminal 5B, the interface circuit of conventional magnetic card reader using the clock signal and the data signal need not be changed in the terminal 5B. Also, since the information other than the plurality of the contactless smart cards 17 exist in the communication range can be received, the failure generated when switching the infrastructure to the infrastructure corresponding to the contactless smart card is not generated and thus investment costs can be suppressed.

Moreover, similar to the first embodiment, since the communication specification of the information or the data of the contactless smart card 17 which is generated at the CPU 4 and output from the I/F part 3 to the terminal 5B is equal to the communication specification of the data of the magnetic card 18, the contactless smart card 17 can be applied to the terminal 5B only by the software change such as program addition, and thus the influence on the terminal 5B can be suppressed to the minimum.

Many modifications and variations of the present invention are possible in the light of the above techniques. It is therefore to be understood that within the scope of the invention the invention may be practiced otherwise than as specifically described.

What is claimed is:

1. An information reading apparatus comprising:
   a first communication part which communicates with a contactless data carrier;
   a second communication part which transmits a predetermined clock signal and a predetermined data signal to the outside of said information reading apparatus, the predetermined data signal having information that a plurality of contactless data carriers exist in a communication range of the first communication part; and
   a control part,
   wherein the control part determines whether the plurality of contactless data carriers exist in the communication range of said first communication part based on a communication result with the contactless data carrier through said first communication part, generates the predetermined clock signal and the predetermined data signal if said control part determines if the plurality of the contactless data carriers exist exist in the communication range of the first communication part, and allows said second communication part to transmit the predetermined clock signal and the predetermined data signal to the upper level apparatus.

2. The information reading apparatus according to claim 1, wherein the data signal transmitted from the second communication part to the upper level apparatus has identification information representing that the plurality of the contactless data carriers exist in the communication range of said first communication part.

3. The information reading apparatus according to claim 1, wherein the information that the plurality of the contactless data carriers exist is information having a format different from a predetermined format standard of a magnetic card.

4. The information reading apparatus according to claim 3, wherein the information having the format different from the predetermined format standard of the magnetic card is information that any one code or both codes of a start mark and an end mark is different from the standard.

5. An information reading apparatus comprising:
   a magnetic card reading part which reads information stored in a magnetic card;
   a magnetic card detecting part which detects whether the magnetic card exists in a predetermined reading region of said magnetic card reading part;
   a first communication part which communicates with a contactless data carrier;
   a second communication part which transmits a clock signal and a data signal to the outside of said information reading apparatus, the data signal having information that the plurality of the contactless data carriers exist in a communication range of the first communication part; and
   a control part, wherein said control part determines whether the plurality of contactless data carriers exist in the communication range of said first communication part based on a communication result with the contactless data carrier through said first communication part, generates the clock signal and the data signal if said control part determines the plurality of the contactless data carriers exist in the communication range of the first communication part, and allows said second communication part to transmit the clock signal and the data signal to the upper level apparatus.

6. The information reading apparatus according to claim 5, wherein the information that the plurality of contactless data carriers exist is information that has the clock signal, the data signal, and a signal which are similarly generated by said control part at a timing different from a timing chart at the time of a magnetic card reading operation, the signal indicating that said magnetic card detecting part has deleted the magnetic card.

7. An information reading apparatus comprising:
a first communication part which communicates with a contactless data carrier;
a second communication part which transmits a predetermined clock signal and a predetermined data signal to the outside of said information reading apparatus, the predetermined data signal having information that the contactless data carrier is not matched to a predetermined specification; and
a control part,
wherein said control part determines whether the contactless data carrier is matched to the predetermined specification based on a communication result with the contactless data carrier through said first communication part, generates the predetermined clock signal and the predetermined data signal if said control part determines the contactless data carrier is not matched to the predetermined specification, and allows said second communication part to transmit the predetermined clock signal and the predetermined data signal to the upper level apparatus.

8. An information reading apparatus comprising:
a magnetic card reading part which reads information stored in a magnetic card;
a magnetic card detecting part which detects whether the magnetic card exists in a predetermined region of the magnetic card reading part;
a first communication part which communicates with a contactless data carrier;
a second communication part which transmits a predetermined clock signal and a predetermined data signal to the outside of said information reading apparatus, the predetermined data signal having information that the contactless data carrier is not matched to a predetermined specification; and
a control part,
wherein said control part determines whether the contactless data carrier is matched to the predetermined specification based on the communication result with the contactless data carrier through said first communication part, generates the predetermined clock signal and the predetermined data signal if said control part determines the contactless data carrier is not matched to the predetermined specification, and allows said second communication part to transmit the predetermined clock signal and the predetermined data signal to the upper level apparatus.

9. The information reading apparatus according to claim 8, wherein the information that the contactless data carrier is not matched to the predetermined specification is information that has the clock signal, the data signal, and a signal which are similarly generated by the control part at a timing different from a timing chart at the time of the magnetic card reading operation, the signal indicating said magnetic card detecting part has detected the magnetic card.

10. An information reading system comprising an information reading apparatus and an upper level apparatus for receiving information from said information reading apparatus, the information reading apparatus comprises:
a first communication part which communicates with a contactless data carrier;
a second communication part which communicates with said upper level apparatus; and
a control part,
wherein said control determines whether a plurality of contactless data carriers exist in a communication range of said first communication part based on a communication result with the contactless data carrier, generates a predetermined clock signal and a predetermined data signal having information that the plurality of the contactless data carriers exist if said control part determines the plurality of the contactless data carriers exist through said first communication part, and allows said second communication part to transmit the predetermined clock signal and the predetermined data signal to said upper level apparatus, and
wherein said upper level apparatus comprises:
a receiving part which receives a reading data and/or the information transmitted from the information reading apparatus;
a notifying part which notifies the information; and
a second control part which analyzes the information received from said information reading apparatus and allows said notifying part to notify the information if said second control part analyzes the information is the information that the plurality of the contactless data carriers exist.

11. The information reading system according to claim 10, wherein the information that the plurality of the contactless data carriers exist, which is transmitted from said information reading apparatus to said upper level apparatus, is information having a format different from a predetermined format standard of a magnetic card.

12. The information reading system according to claim 11, wherein the information having the format different from the predetermined format standard of the magnetic card is information that any one card or both cards of a start mark and an end mark is different from the standard.

13. The information reading system according to claim 10, wherein the data signal which is transmitted from said information reading apparatus to said upper level apparatus includes identification information that the plurality of the contactless data carrier exist in the communication range of said first communication part.

14. An information reading system comprising an information reading apparatus and an upper level apparatus for receiving information from said information reading apparatus, said information reading apparatus comprises:
a magnetic card reading part;
a magnetic card detecting part which detects whether the magnetic card exists in said magnetic card reading part;
a first communication part which communicates with a contactless data carrier;

a second communication part which communicates with said upper level apparatus; and a control part, wherein said control part determines whether a plurality of contactless data carriers exist in a communication range of said first communication part based on a communication result with the contactless data carrier through said first communication part, generates a predetermined clock signal and a predetermined data signal having information that the plurality of the contactless data carriers exist if the control part determines the plurality of the contactless data carriers exist, and allows said second communication part to transmit the predetermined clock signal and the predetermined data signal to said upper level apparatus, and wherein said upper level apparatus comprises:

a receiving part which receives a reading data or the information transmitted from said information reading apparatus;

a notifying part which notifies the information; and a second control part which analyzes the information received from said information reading apparatus and allows said notifying part to notify the information said second control part analyzes if the information is the information that the plurality of the contactless data carriers exist.

15. The information reading system according to claim 14, wherein the information that the plurality of contactless data carriers exist, which is transmitted from said information reading apparatus to said upper level apparatus, is information that has the clock signal, the data signal, and a signal which are similarly generated by said control part at a timing different from a timing chart at the time of a magnetic card reading operation, the signal indicating the magnetic card detecting part has detected the magnetic card.

16. An information reading system comprising an information reading apparatus and an upper level apparatus for receiving information from said information reading apparatus, said information reading apparatus comprises:

a first communication part which communicates with a contactless data carrier;

a second communication part which communicates with said upper level apparatus; and a control part, wherein said control part determines whether the contactless data carrier is matched to a predetermined specification based on a communication result with the contactless data carrier through said first communication part, generates a predetermined clock signal and a predetermined data signal having the information if said control part determines the contactless data carrier is not matched to the predetermined specification, and allows said second communication part to transmit the predetermined clock signal and the predetermined data signal to said upper level apparatus, and wherein said upper level apparatus comprises:

a receiving part which receives a reading data and/or the information transmitted from the information reading apparatus;

a notifying part which notifies the information; and a second control part which analyzes the information received from said information reading apparatus and allows said notifying part to notify the information if said second control part analyzes the information is the information that the contactless data carriers is not matched to the predetermined specification.

17. An information reading system comprising an information reading apparatus and an upper level apparatus for receiving information from said information reading apparatus, said information reading apparatus comprises:

a magnetic card reading part which reads information stored in a magnetic card;

a magnetic card detecting part which detects whether the magnetic card exists in a predetermined region of said magnetic card reading part;

a first communication part which communicates with a contactless data carrier;

a second communication part which communicates with said upper level apparatus; and a control part, wherein said control part determines whether the contactless data carrier is matched to a predetermined specification based on a communication result with the contactless data carrier through said first communication part, generates a predetermined clock signal and a predetermined data signal having the information that the contactless data carrier is not matched to the predetermined specification if said control part determines the contactless data carrier is not matched to the predetermined specification, and allows said second communication part to transmit the predetermined clock signal and the predetermined data signal to said upper level apparatus, and wherein said upper level apparatus comprises:

a receiving part which receives a reading data or the information transmitted from said information reading apparatus;

a notifying part which notifies the information; and a second control part which analyzes the information received from said information reading apparatus and allows the notifying part to notify the information if said second control part analyzes the information is the information that the contactless data carriers is not matched to the predetermined specification.

18. The information reading system according to claim 17, wherein the information that the contactless data carrier is not matched to the predetermined specification, which is transmitted from said information reading apparatus to said upper level apparatus, is information that has the clock signal, the data signal, a signal which are similarly generated by said control part at a timing different from a timing chart at the time of a magnetic card reading operation, the signal indicating that said magnetic card detecting part has detected the magnetic card.

* * * * *